Oct. 30, 1934.                J. M. AUFIERO                1,978,484
                                 MOTOR
                            Filed Oct. 8, 1931
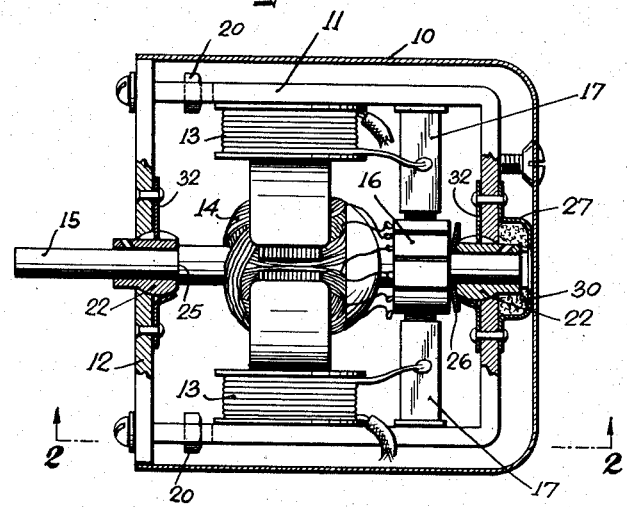
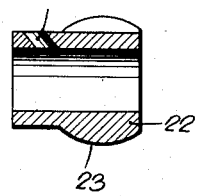
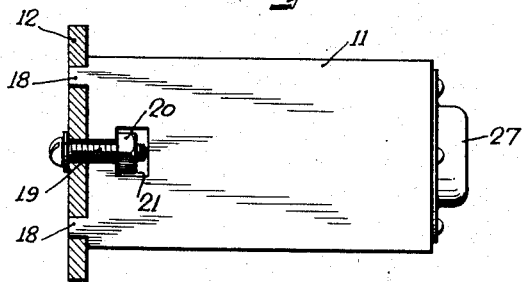
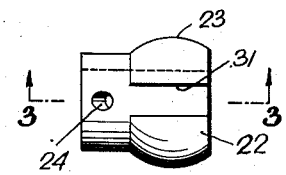
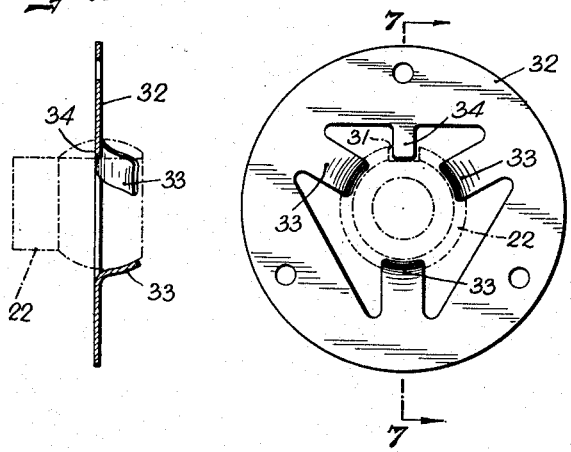
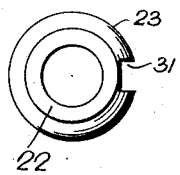
INVENTOR.
JOHN M. AUFIERO,
BY Duell, Dunn & Anderson
ATTORNEYS.

Patented Oct. 30, 1934

1,978,484

UNITED STATES PATENT OFFICE 1,978,484

MOTOR

John M. Aufiero, Brooklyn, N. Y., assignor to E. A. Laboratories, Inc., Brooklyn, N. Y., a corporation of New York Application October 8, 1931, Serial No. 567,647

1 Claim. (Cl. 308—72)

This invention relates to a functionally and structurally improved motor.

It is an object of the invention to provide a device of this character which will embody a bearing structure such that the parts may be assembled with facility by relatively unskilled labor, these parts being readily manufactured by automatic machinery, and when assembled, operating over long periods of time with freedom from difficulty.

A further object of the invention is that of furnishing a frame which may be readily manufactured and assembled, and when so assembled, will have its component parts immovable with respect to each other, although such parts may be readily disassembled if desired.

With these and other objects in mind, reference is had to the attached sheet of drawings, illustrating one practical embodiment of the invention, and in which:

Figure 1 is a partly sectional side view of a motor assembly;

Figure 2 is an edge view, taken along the lines 2/2 and in the direction of the arrows of Figure 1;

Figure 3 is an enlarged sectional view of one of the bearing elements;

Figure 4 is a plan view thereof;

Figure 5 is an end view of this element;

Figure 6 is an enlarged face view of the bearing retaining clamp and

Figure 7 is a sectional side view taken along the lines 7/7 and in the direction of the arrows of Figure 6.

In these several views the numeral 10 indicates a motor casing, within which a U-shaped frame member 11 is disposed. Extending between the arms of this frame member is a bar or plate 12 which may be of a contour such that in cooperation with the casing 10 it provides an enclosing structure.

Mounted upon the arms of the member 11 are the motor fields 13 and disposed between these units is the motor armature 14, which is mounted upon the shaft 15. This shaft also supports a commutator 16 which cooperates with brushes 17, also mounted upon the arms of the member 11.

Now, with a view to maintaining the parts in assembled relationship, it will be observed that according to the present invention the outer edges of the arms preferably have projections or extended portions 18 which are accommodated within slots or recesses formed in the plate 12. Thus, relative sidewise movement of these parts is prevented and in order to maintain the same against separation it will be noted—especially as shown in Fig. 2—that the plate 12 may be formed with openings accommodating the bodies of bolts 19 mounting nuts 20. The bolt bodies extend in line with slots formed in the end edges of member 11 and these slots are enlarged to an extent such—and as indicated at 21—that the nuts 20 may be accommodated therein and tightened to bear against the edges of the enlarged slot portions so that the member may intimately bear against the plate 12 with the projections 18 firmly seated in the recesses or slots of the latter.

According to the present invention, the bearing structure is of that type which is specifically illustrated in Figs. 1, 3, 4 and 5. In these figures the numeral 22 indicates a sleeve member which rotatably supports the shaft 15. This sleeve member is exteriorally enlarged, as at 23, in the form of a knob or head and may have an oil passage 24 formed through its body. As particularly shown in Fig. 1, the shaft 15 may have a shoulder portion 25 which bears against the sleeve member with a view to preventing longitudinal relative movement of the parts. Of course, at the rear end of the shaft, such movement may be prevented by simply utilizing a washer 26 interposed between the sleeve member and the commutator. However, in both instances it will be observed that the bodies of the member 11 and plate 12 are counter-sunk in order to provide in conjunction with the bearing members, what might be termed a ball and socket structure. Moreover, both of the bearing elements may be of sufficient length so that their reduced portions extend through and beyond the parts with which they are associated so that the oil openings or channels 24 thereof may be accessible. In fact, if desired, an encasing member 27 may be secured to one of the bearing-supporting members and provide a lubricant reservoir in conjunction therewith, which reservoir may obviously contain a pad 30 of oil-absorbent and retaining material which will serve to maintain, for long periods of time, the proper lubrication of the bearing.

In order to retain the bearing members against displacement, it will be observed that they are preferably slotted, as has been indicated at 31, and after positioning with respect to the supporting members, there are applied thereto retaining plates 32 generally indicated in Figs. 6 and 7. These retaining plates may be formed of sheet metal and have a central opening defined by inwardly extending resilient clip portions 33 which bear against the head or knob portion of the bearing elements in order to prevent displacement thereof. One of these clip elements 34, however, bears within the slot portion 31 of the associated bearing element and consequently serves to retain the same against rotation with respect to the member supporting the same. It will be appreciated that by virtue of this construction the bearing will be adequately retained against accidental movement and will be automatically self-centering.

From the foregoing it will be appreciated that an extremely compact structure is provided which lends itself readily to mass manufacture and assembly. As a consequence, among others, the several objects of the invention as specifically aforenoted, are achieved. It is obvious that numerous changes in construction and rearrangements of the parts may be resorted to without departing from the spirit of the invention as defined by the claim.

Having described my invention, what I claim as new and desire to secure by Letters Patent is:

An electric motor comprising a frame, bearing members removably carried by said frame, spherical portions forming a part thereof, said bearing being formed with a groove extending longitudinally through said spherical portion, and a plate adapted to be secured to said frame and provided with resilient clip portions for engaging the edges of said spherical bearing portion and an additional clip portion for entering said bearing groove to hold said bearing against rotation.

JOHN M. AUFIERO.